(12) United States Patent
Wilson

(10) Patent No.: US 9,926,894 B2
(45) Date of Patent: *Mar. 27, 2018

(54) INTAKE MANIFOLD

(71) Applicant: Keith Wilson, Fort Lauderdale, FL (US)

(72) Inventor: Keith Wilson, Fort Lauderdale, FL (US)

(73) Assignee: MKC FLOW, LLC, Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,773

(22) Filed: Feb. 29, 2016

(65) Prior Publication Data
US 2016/0177895 A1    Jun. 23, 2016

Related U.S. Application Data

(63) Continuation of application No. 14/194,911, filed on Mar. 3, 2014, now Pat. No. 9,273,653.

(51) Int. Cl.
*F02M 35/10* (2006.01)
*F02M 35/104* (2006.01)
*F02M 35/112* (2006.01)

(52) U.S. Cl.
CPC .... *F02M 35/10052* (2013.01); *F02M 35/104* (2013.01); *F02M 35/10078* (2013.01);
(Continued)

(58) Field of Classification Search
CPC .......... F02M 35/104; F02M 35/10262; F02M 35/10144; F02M 35/10039;
(Continued)

(56) References Cited

U.S. PATENT DOCUMENTS 3,109,416 A    5/1960   Rose et al.
4,210,107 A    7/1980   Shaffer
(Continued)

FOREIGN PATENT DOCUMENTS

DE    10028074      5/2001
JP    2003074357 A  3/2003

OTHER PUBLICATIONS

Issabekov. Intake Manifold Flow Simulation. YouTube. Nov. 18, 2013. [retrieved on May 4, 2015]. Retrieved from the internet: <URL: https://www.youtube.com/watch?v=nZorW4yfSbc> entire video.

*Primary Examiner* — Long T Tran
(74) *Attorney, Agent, or Firm* — Lewis Brisbois Bisgaard & Smith, LLP; Geoffrey Lottenberg

(57) ABSTRACT

A bolt-on replacement intake manifold has an asymmetrical plenum with a first end including an inlet, a closed terminal end, a concave top surface and a convex bottom surface; a flange; and a plurality of runners extending from the bottom surface of the plenum and terminating at the flange. The plenum defines an interior space in flow communication with the runners. The bottom surface of the plenum is wider than the top surface. The plenum initially widens from the inlet to the first runner and then begins to narrow from the first runner toward the last runner adjacent to the closed terminal end. The runners are tapered, curved, and vary in length. The intake manifold causes air to exit each of the plurality of runners at substantially the same angle. The manifold balances airflow across each runner and increases swirl inside the cylinders enhancing fuel economy, power output, and torque.

6 Claims, 7 Drawing Sheets

(52) U.S. Cl.
CPC ........... *F02M 35/10085* (2013.01); *F02M 35/10091* (2013.01); *F02M 35/10098* (2013.01); *F02M 35/112* (2013.01); *Y02T 10/146* (2013.01)

(58) Field of Classification Search
CPC ....... F02M 35/10078; F02M 35/10052; F02M 35/10072; F02M 35/10; F02M 35/10026
See application file for complete search history.

(56) References Cited

U.S. PATENT DOCUMENTS

| | | | |
|---|---|---|---|
| 4,805,564 A | 2/1989 | Hudson, Jr. | |
| 5,005,532 A | 4/1991 | Shillington | |
| 5,642,698 A | 7/1997 | Diehl et al. | |
| 6,422,221 B2 * | 7/2002 | Pietrowski | F02B 75/22 123/184.61 |
| 6,571,760 B2 | 6/2003 | Kallander | |
| 6,776,132 B2 * | 8/2004 | Kudo | F02M 35/10111 123/184.42 |
| D517,567 S * | 3/2006 | Teeter | D15/5 |
| 7,073,473 B2 | 7/2006 | Boyes | |
| 7,086,365 B1 | 8/2006 | Teeter | |
| 8,037,859 B2 | 10/2011 | Kameda | |
| D654,094 S * | 2/2012 | Dralle | D15/5 |
| D674,408 S * | 1/2013 | Hsu | D15/5 |
| 8,365,695 B2 | 2/2013 | Wakamatsu et al. | |
| D677,700 S * | 3/2013 | Hsu | D15/5 |
| 8,511,289 B2 | 8/2013 | Tanikawa et al. | |
| 2014/0165948 A1 * | 6/2014 | Sekiguchi | F02M 35/10 123/184.21 |

* cited by examiner

INTAKE MANIFOLD

CROSS REFERENCE TO RELATED APPLICATIONS

This application is a continuation of U.S. patent application Ser. No. 14/194,911 filed on Mar. 3, 2014.

STATEMENT REGARDING FEDERALLY SPONSORED RESEARCH OR DEVELOPMENT

N/A

BACKGROUND OF THE INVENTION

1. Field of the Invention

The present invention generally relates to components for internal combustion engines and more particularly to an intake manifold for use on high output engines including diesel engines found on semi-trailer trucks.

2. Description of Related Art

It is well established that power and torque output are of utmost importance in the field of semi-trailer and semi-tractor trailer truck engines. Certainly in many instances power and torque are maximized at the expense of fuel economy. However, with the onset of ever-increasing fuel costs, efficiency has been brought to the forefront of tractor-trailer technology. As many tractor-trailers have an average operational life expectancy exceeding ten (10) years, there is a definite need to find ways to increase the efficiency of existing engine designs. Indeed, newer and more efficient engine designs are always in the pipeline, but it is not always the most economical solution to swap out equipment or send otherwise reliable and durable tractor-trailer engines to end-of-life.

Diesel engines have long been known to provide greater torque and often better fuel efficiency than gasoline engines. Generally speaking, a diesel engine, also known as a compression-ignition engine, is an internal combustion engine that uses the heat of compression to initiate ignition and burn the fuel that has been injected into the combustion chamber. This contrasts with spark-ignition engines such as a gasoline engines that use a spark plug to ignite an air-fuel mixture. Ignition inside a diesel engine is achieved when one or more pistons reciprocating inside a cylinder physically compresses air introduced into the cylinder to the point where the air reaches a high enough temperature to ignite vaporized diesel gasoline injected into the cylinders. The vaporized fuel then combusts and drives the piston outward from the cylinder, supplying power to the crankshaft.

Generally speaking, the higher the compression ratio of the engine, i.e. the ratio between the volume of the cylinder at its largest capacity to the volume at its smallest capacity, the more efficient the engine. Because diesel engines do not have fuel in the cylinder before combustion is initiated, a large amount of air can be loaded in the cylinder without pre-ignition and therefore higher compression ratios can be achieved as compared to gasoline engines. As having more air in the cylinders allows more fuel to be burned at a more efficient rate, optimizing the volume of air in the cylinders is the key to unlocking a diesel engine's efficiency and power.

Many solutions for maximizing air flow into the cylinders have been used, such as superchargers and turbochargers (or combinations of the two) but there has not been much thought put into the actual air intake manifolds of the these engines. Traditional intake manifolds for diesel engines, particularly those used on tractor-trailer engines, such as the Volvo D13 motor, comprise a rudimentary "shoe box" design, shown in FIG. 1. These intake manifolds have a basic box-shaped plenum with an air inlet and an open bottom in flow communication with a cylinder head in which the cylinders and cylinder valves are seated. Typically the inlet of the intake manifold is in flow communication with an intercooler that receives compressed or "forced" air from a tuborcharger. Such a design is prone to significant flow and pressure losses and substantial variance in airflow and pressure from one cylinder to the next as inlet air tends to collect at the rear end of the plenum, causing more air to enter the cylinders at the rear leading to a leaner fuel/air ratio as compared to the cylinders toward the front of the plenum, which receive less air and therefore have a richer fuel/air ratio. An imbalance in airflow rates and in turn cylinder pressure causes an uneven distribution of power across the cylinders leading to decreased overall efficiency, power output, and fuel economy as the "richer" cylinders in effect pull the "leaner" cylinders around the crank shaft. Accordingly, there is a need in the art for an improved bolt-on replacement intake manifold design, particularly useful for large diesel engines, that provides measurably increased efficiency and fuel economy by correcting the imbalance of air flow rates and pressure across the cylinders.

Several attempts have been made to design intake manifolds that increase power and output, however none are sufficiently engineered to overcome the existing problems with manifolds for large diesel engines.

For example, U.S. Pat. No. 7,073,473 to Boyes describes a tunable intake manifold for directing a flow of air between a plenum and an internal combustion engine. The tunable intake manifold includes a manifold housing defining an interior. The manifold housing has a plurality of runner walls extending through the interior. The tunable intake manifold also includes a slider having a slider wall having an angled portion separated from a primary portion by a curved portion. The slider wall extends through the interior of the manifold housing. The slider wall cooperates with the runner wall to define a runner having a defined cross sectional area for transporting the flow of air therethrough. The slider is slidably engaged with the manifold housing for moving the slider wall relative to the runner wall to selectively change the defined cross sectional area of the runner, such that the volume of air passing therethrough changes with the movement of the slider. The angled portion of the slider travels parallel to the runner wall at a transmitting end of the runner.

U.S. Pat. No. 6,571,760 to Kallander describes an intake manifold comprising a first end, an opposing second end with an end wall, and at least a first internal wall, if the body of the air inlet manifold has a circular cross-section. Alternatively, the air inlet manifold body has a rectangular cross-section, with several internal walls. The air inlet manifold extends in a longitudinal direction from the first end to the second end. The air inlet manifold has an air inlet at the first end and at least one distribution chamber for air extending along the longitudinal direction and restricted by at least the first internal wall. The air inlet manifold also has at least one air pipe for each cylinder. The pipes are distributed along the longitudinal direction. The pipes or runners protrude perpendicularly from the manifold. For at least one of the pipes, a profile between the first line and the second line located proximate to the air inlet has different curvature than a profile between the first line and the second line located distant from the air inlet. The profiles may advantageously be in the form of curvatures and the first area is preferably greater than the second area. Preferably, the profile between the first line and the second line located proximate to the air inlet has a greater curvature than the profile between the first line and the second line located distant from the air inlet, and preferably the first area is greater than the second area.

U.S. Pat. No. 5,005,532 to Shillington describes a manifold characterized by a plenum surrounded by runners that spiral around the plenum sidewall to the entrances to the engine cylinders. The circumferential extent of each runner exceeds 360 degrees about a longitudinal axis of the plenum.

Japanese Patent JP2003074357 to Mamisa describes an intake manifold having a plurality of intake branch passages for distributing intake air from an intake collecting part of an intake manifold to the respective cylinders. The branches or runners have bend portions bent toward the centers of the respective related cylinders, on an intake branch passage side of connection portions to intake ports on a the cylinder head. A bend portion connected to a cylinder more distant from an intake-introducing portion of the intake collecting part has a larger curvature. This manifold is designed for gasoline engines and provides two runners per valve in a complex configuration.

It is, therefore, to the effective resolution of the aforementioned problems and shortcomings of the prior art that the present invention is directed. However, in view of the intake manifolds in existence at the time of the present invention, it was not obvious to those persons of ordinary skill in the pertinent art as to how the identified needs could be fulfilled in an advantageous manner.

SUMMARY OF THE INVENTION

The present invention provides an intake manifold configured to improve the overall fuel efficiency, and power and torque output of an internal combustion in engine. In some embodiments, the intake manifold comprises an asymmetrical plenum having a first end including an inlet, a closed terminal end, a top surface and a bottom surface; a flange; and a plurality of runners extending from the bottom surface of the plenum and terminating at the flange. The plenum defines an interior space in flow communication with the runners. The bottom surface of the plenum is wider than said top surface and, in some embodiments, the cross-section of the plenum has a rounded triangular shape. In some embodiments, the top surface is concave and the bottom surface is convex. The plenum initially widens from the inlet to the first runner and then begins to narrow from the first runner toward the last runner adjacent to the closed terminal end. With this configuration, the intake manifold causes air to exit each of the plurality of runners at substantially the same angle.

The asymmetrical shape of the runner causes air to initially slow down as it enters the inlet, allowing time for air to enter the first few runners without racing by. Further, the top to bottom taper of the plenum creates a pressure differential across the plenum, with higher pressure at the top and lower pressure toward the entry of the runners which forces air out from the plenum and through to the runners. In some embodiments, the runners are tapered from the plenum toward the flange, are curved, and vary in length to promote air to exit the runners at substantially the same angle. Additionally, an interior aspect of the runners is radiused where the runners meet the bottom surface of the plenum.

The manifold is configured to bolt-on to a cylinder head at the flange, placing each of the runners in flow communication with a respective conduit of the cylinder head. The manifold is effective to balance the airflow rates across the runners and also provides an optimal angle of air entry into the cylinder head to increase swirl inside the cylinders. The improved airflow balancing and swirl cause a cleaner and more efficient fuel burn which leads to substantial gains in fuel economy, power output and torque.

Accordingly, it is an object of the present invention to provide a bolt-on replacement intake manifold for an internal combustion engine that effectively balances airflow rates across the cylinders of the engines to provide a more efficient fuel burn leading to enhanced fuel economy, power output, and torque.

It is another object of the present invention to provide an intake manifold that increases airflow swirl inside the cylinders for a more robust combustion of fuel.

It is yet another object of the present invention to provide an intake manifold that does not require a reconfiguration of the engine compartment.

It is yet another object of the present invention to provide an intake manifold that is durable, efficient, and seamless with the constitute components of the engine.

In accordance with these and other objects that will become apparent hereinafter, the instant invention will now be described with particular reference to the accompanying drawings.

DETAILED DESCRIPTION

Figure 1:
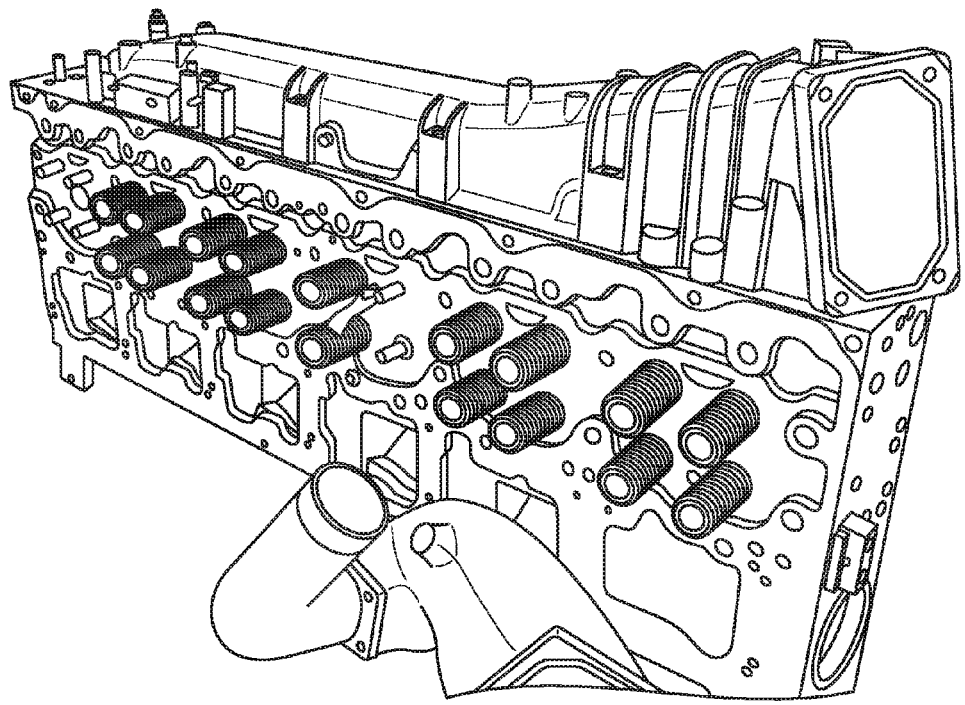
FIG. 1 is perspective view of the prior art intake manifold used on a Volvo D13 diesel engine.
Figure 2:
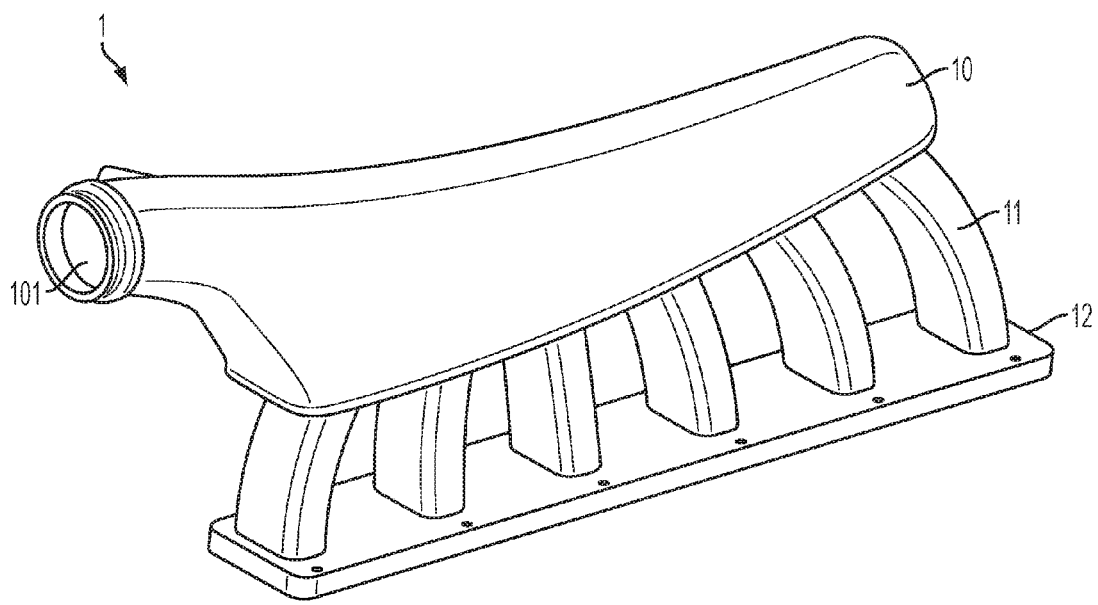
FIG. 2 is a perspective view of one embodiment of the intake manifold of the present invention.

FIG. 2 is a perspective view of one embodiment of the intake manifold 1 of the present invention. Manifold 1 comprises a plenum 10, a plurality of runners 11, and a flange 12. The runners 11 are disposed longitudinally along the plenum 10 extending from and in flow communication with the plenum 10, terminating at the flange 12. In this exemplary embodiment, the manifold 1 includes six runners 11a, 11b, 11c, 11,d, 11e, and 11f corresponding to each cylinder of a six-cylinder diesel engine. The flange 12 provides mounting structure to allow the intake manifold 1 to be secured to a cylinder head of an engine, as will become more apparent throughout this disclosure. In some embodiments, the plenum 10 includes an inlet port 101 at a first end and defines an interior space that is configured to receive air from the inlet port 101 and distribute it to the runners 11. The inlet port 101, in some embodiments, receives compressed intake air from an intercooler attached to a turbocharger or a traditional air intake assembly in the case of a naturally aspirated engine. As shown in FIG. 2, the runners 11 have varying length and curvature relative to the plenum however all terminate at the flange 12 at the same elevation. The runners 11 are also tapered, i.e. narrow down, from the plenum to the flange 12.

Figure 3:
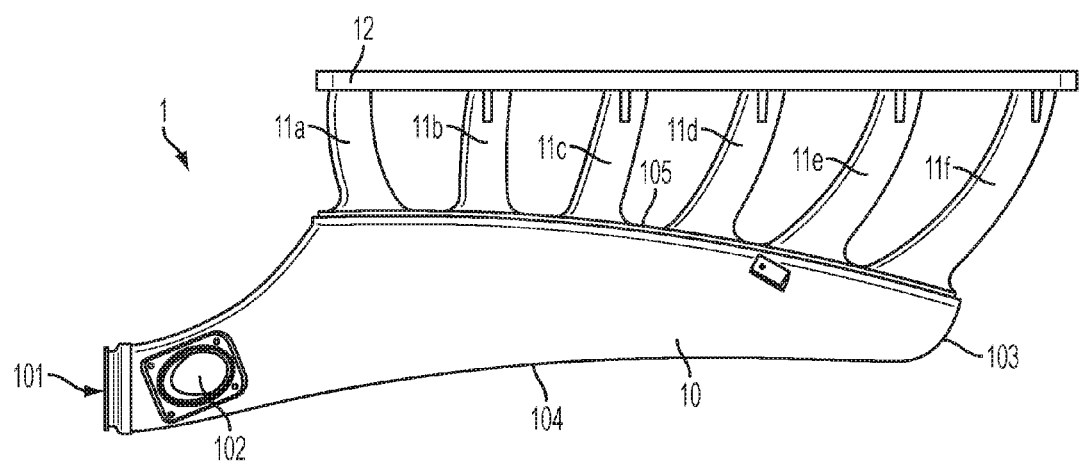
FIG. 3 is a top view of one embodiment of the intake manifold of the present invention.
Figure 4:
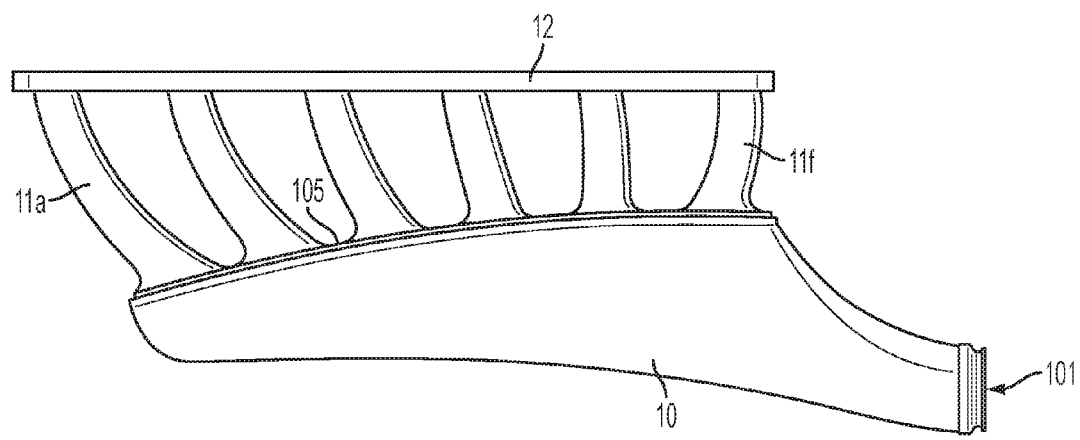
FIG. 4 is a bottom view of one embodiment of the intake manifold of the present invention.

FIGS. 3 and 4 are respective top and bottom views of the intake manifold 1 in isolation. Here it can be seen that the plenum 10 has a generally asymmetrical shape that initially widens from the inlet 101 to the first runner 11a and then narrows or tapers down in width from the first runner 11a to its terminal end 103. As shown, the width of the plenum is largest adjacent to the first runner 11a and smallest adjacent to the last or sixth runner 11f. Further, starting at third runner 11c and moving toward sixth runner 11f, the length of each runner increases. As the length of each successive runner increases from runner 11c to 11f, the curvature also increases, with the longest runner, sixth runner 11f, having the largest curvature. For purposes of fitment, first and second runners 11a and 11b are shorter in length than the rest of the runners, with second runner 11b being the shortest.

The curvature and profile of the plenum 10 is defined by a concave top surface 104 that curves inward toward the center of the plenum 10 and a convex bottom surface 105 of the plenum 10 that curves away from the center of the plenum 10. From the inlet 101, the plenum 10 initially widens toward the first runner 11a and then gradually narrows toward the terminal end 103. This profile, in combination with the other features of the invention, provides optimal airflow characteristics, as further described. Optionally provided is an auxiliary air inlet 102 which may be connected to an exhaust line to provide for recirculation of fuel-containing exhaust gases effective for lowering the emissions of the engine.

Figure 5:
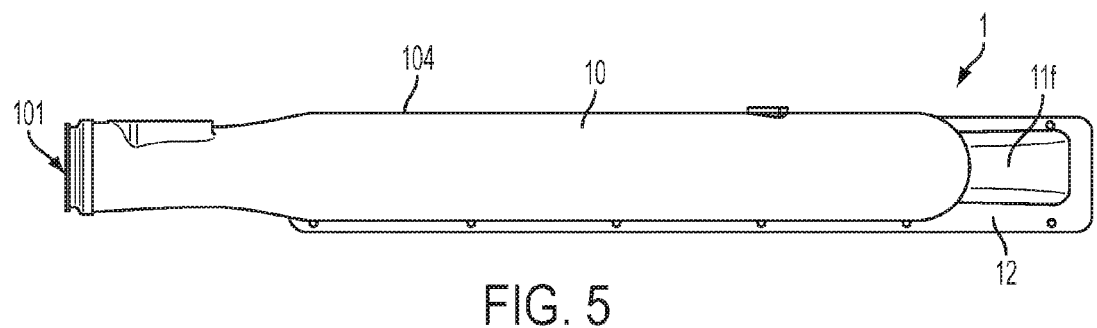
FIG. 5 is a side view of one embodiment of the intake manifold of the present invention.
Figure 6:
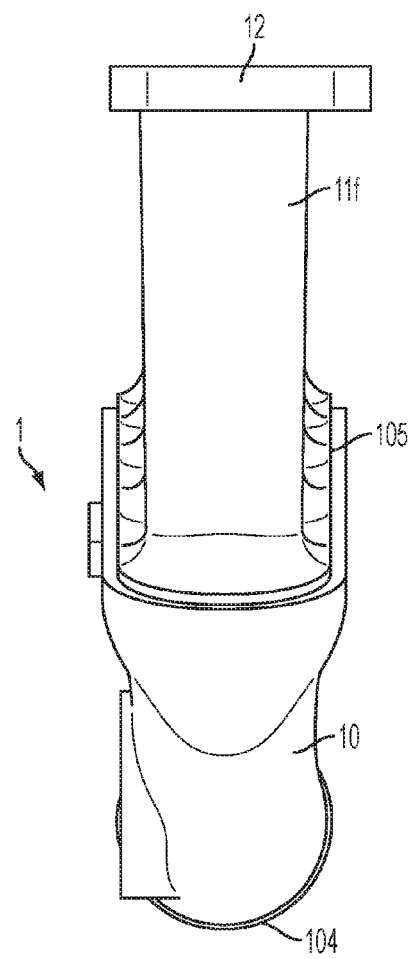
FIG. 6 is a rear view of one embodiment of the intake manifold of the present invention.
Figure 7:
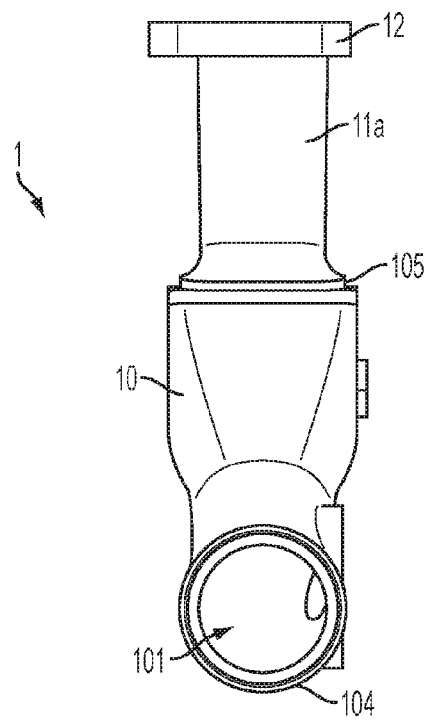
FIG. 7 Is a front view of one embodiment of the intake manifold of the present invention.

FIG. 5 is a side view of the manifold 1 shown from the aspect of the top surface 104 of the plenum 10. FIG. 6 is a rear view of the manifold 1. Here it can be seen that the bottom surface 105 of the plenum 10 is wider than the top surface 104, i.e. the plenum narrows from the bottom 105 to the top surface 104. This narrowing allows for the creation of high pressure zones toward the top surface 104 and low pressure zones toward the bottom surface 105, which creates a pressure differential that forces air into the runners 11 in order to optimize and balance air flow across the runners. FIG. 7 is a front view of the manifold 1 also showing the generally wide bottom surface 105 as compared to the top surface 104.

Figure 8:
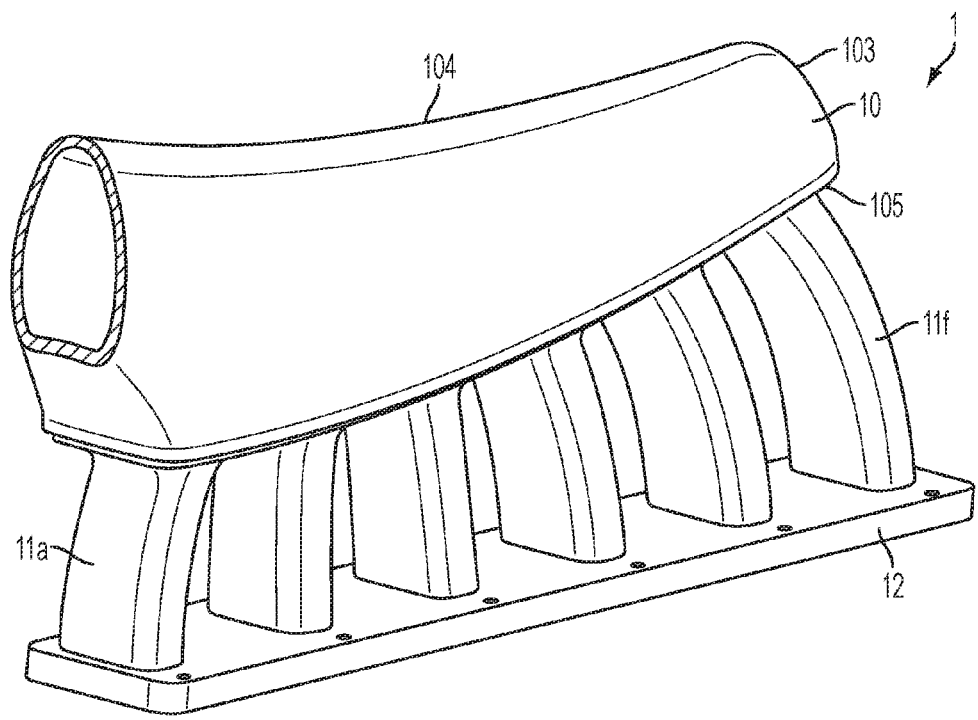
FIG. 8 is a sectional cutaway view of one embodiment of the intake manifold of the present invention showing the plenum geometry forward of the first cylinder runner.
Figure 9:
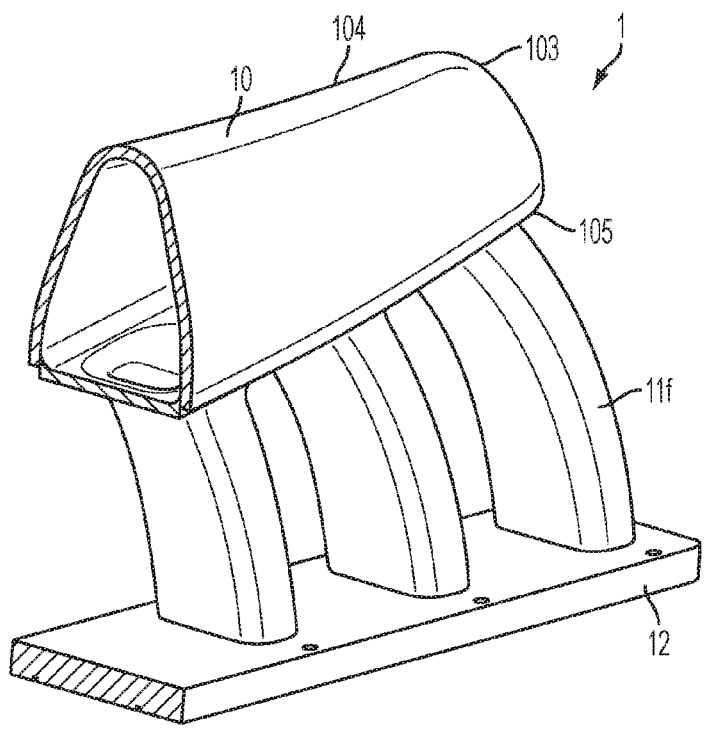
FIG. 9 is a sectional cutaway view of one embodiment of the intake manifold of the present invention showing the plenum geometry between the third and fourth cylinder runners.

FIGS. 8 and 9 show cutaway perspective views of the manifold 1 at two locations along the length of the plenum 10. FIG. 8 shows the cross-sectional geometry of the plenum 10 at a location just forward of the first runner 11a. Here, the cross-section of the plenum 10 has a generally rounded triangular profile, again narrower at the top surface 104 and wider at the bottom 105 promoting a pressure differential inside the plenum 10. FIG. 9 shows the cross-sectional geometry of the plenum 10 at a location at a halfway point along the length of the plenum 10, i.e. between the third and fourth runners 11. Here, the cross-section also has a generally rounded triangular profile similar to the profile shown in FIG. 8 except that the cross-section surface area at this point is larger than that shown in FIG. 8. Moving away from the cross-section shown in FIG. 9 toward the terminal end 103, the surface area will decrease in accordance with the tapered shape of the plenum 10. These characteristics are consistent with the overall plenum shape that gradually increases in size from the inlet 101 to the first runner 11a and then begins to decrease toward terminal end 103. Said succinctly, the plenum generally narrows from first runner 11a toward the last runner 11f and generally narrows from bottom to top.

Figure 10:
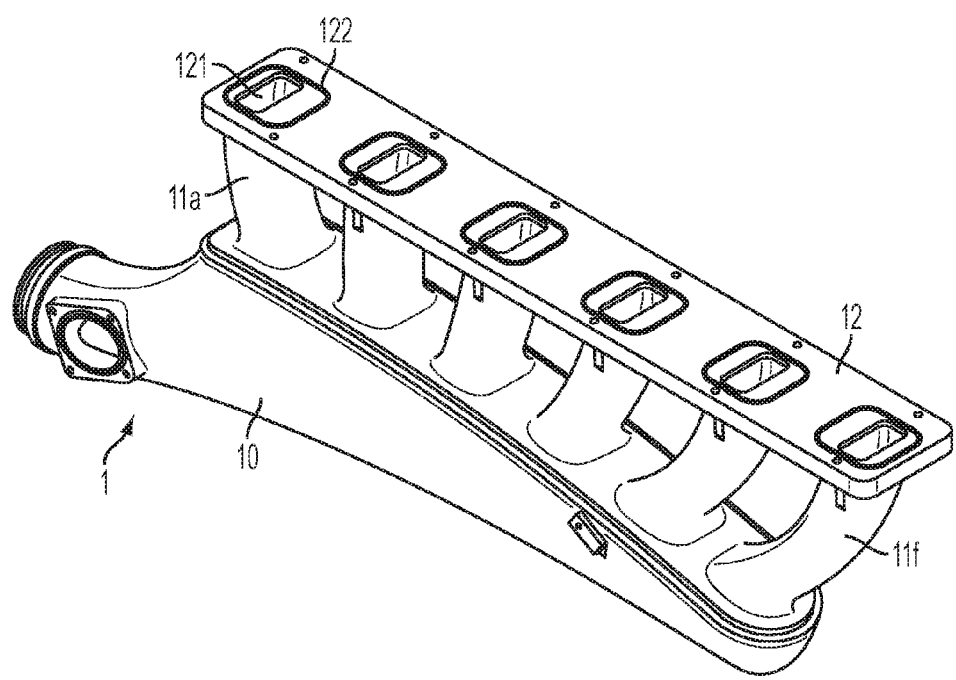
FIG. 10 is a perspective view of one embodiment of the intake manifold of the present invention showing the interior aspects of the flange

FIG. 10 is a cutaway perspective view showing the flange side of the manifold 1 and in particular the underside of the flange 12 thereof. As shown, the flange 12 includes a plurality of ports 121 aligned and in flow communication with the runners 11 of the manifold 1. In some embodiments, disposed around each port 121 is an O-ring 122 that provides a seal between the flange and the cylinder head (not pictured). In some embodiments, the ports 121 are smaller than the intake conduits 21 on the cylinder head of a given motor (See FIG. 12), which serves to focus the airflow from the runners at the centerline thereof to optimize airflow and efficiency.

Figure 11:
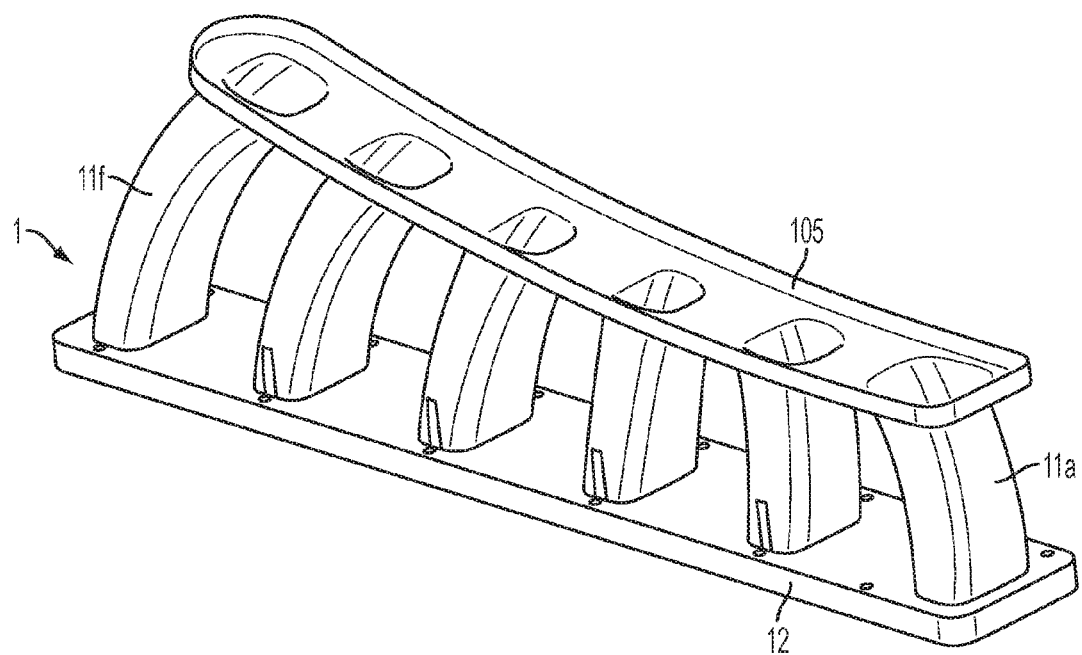
FIG. 11 is a cutaway top view of one embodiment of the intake manifold of the present invention shown with the plenum removed.

FIG. 11 is another perspective view of the manifold 1 of the invention shown here with most of the plenum 10 removed from view. Here, the bottom surface 105 of the plenum is exposed to show the interior aspects of the runners 11. It can be seen that the interior of the runners 11 are circumferentially radiused at the junction between the bottom surface 105 and the runners 11. This radiusing removes any abrupt geometry from the inside of the manifold 1 in an effort to smooth out airflow within the manifold 1.

Figure 12:
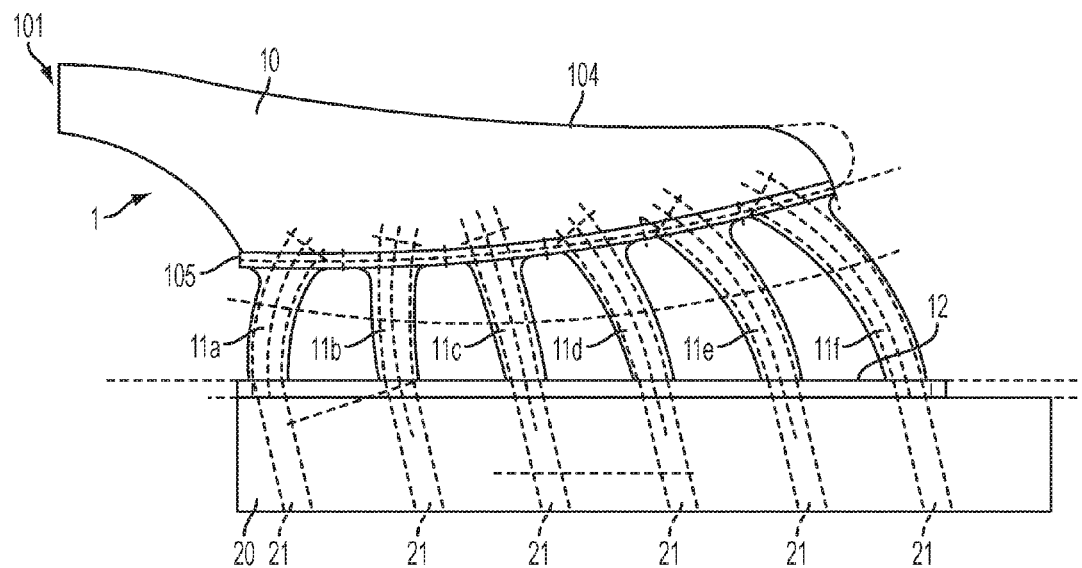
FIG. 12 is a cutaway top view of one embodiment of the intake manifold of the present invention shown attached to a cylinder head.
Figure 13:
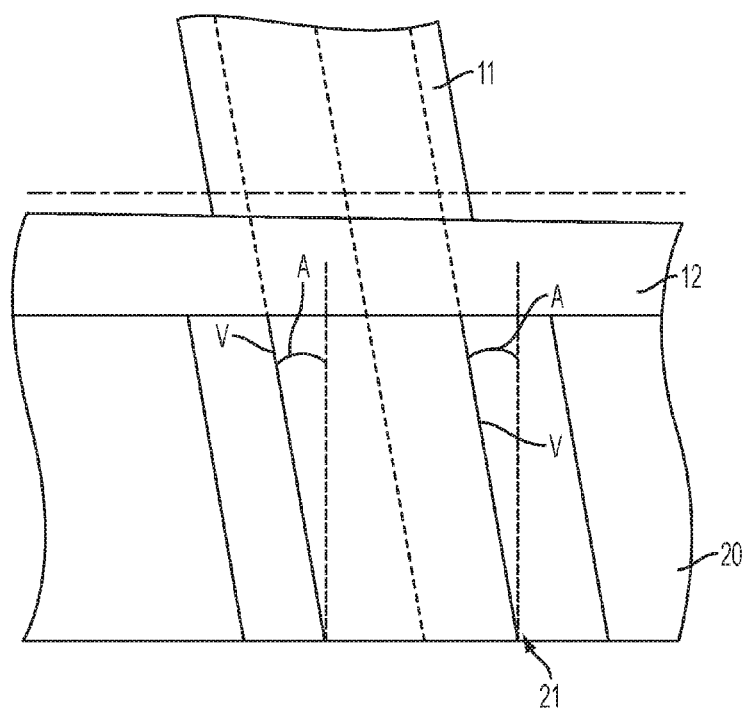
FIG. 13 is a close up of the engagement of the runners to the cylinder head showing the airflow vector angle relative to the cylinder head conduits.

FIG. 12 is a top view of one embodiment of the manifold 1 secured to an exemplary cylinder head 20. The cylinder head has a plurality of conduits 21 that are in flow communication with a respective runner 11. In some embodiments, the conduits 21 are angled with respect to the head in order to match the particular geometry of the engine cylinders within the engine block. The conduits 21 feed into the cylinders of the engine to introduce air therein for compression and eventual ignition of fuel by way of heat of compression. Here it can be seen that, in some embodiments, the runners 11 are narrower than the conduits 21 which is effective for directing airflow exiting the runners to the problem angle. With reference to close-up FIG. 13, the runners 11 are each sized and curved such that the angle A of the resultant airflow vector V existing each runner 11 and entering each conduit 21 of the cylinder head relative to the centerline of the conduits 21 is substantially equal. In other words, the arrangement of the intake manifold 1 is such that air exits each runner 11 at substantially the same angle. In some embodiments, with particular application to the Volvo D13 diesel engine head, the optimal angle A of the airflow vector V is 11 degrees, which matches the angles of the ports 21 incident to the cylinder head 20. In the particular embodiment shown in FIG. 12, this is accomplished by shaping the runners 11c-11f such that the longer the runner length, the greater the curvature thereof, providing the ideal "line of sight" of air from the plenum into the runners and down into the cylinder head. The first runner 11a is slightly longer than the second runner 11b in order to accommodate the geometry of the plenum 10 while maintaining the ideal airflow vector angle.

The intake manifold 1 of the present invention provides substantial increases in power and overall fuel economy primary by balancing the airflow to each cylinder of the engine that otherwise is not possible with the traditional "shoe box" design. More specifically, the widening of the plenum just past the inlet 101 actually slows down the airflow somewhat to allow sufficient air to enter the first and second runners 11a and 11b. This solves the problem in the traditional design where air races past the first few cylinders and collects at the closed rear end of the plenum, causing an uneven mixture of fuel and air among the cylinders. After the initial widening of the plenum, the plenum tapers down in width that, in combination with incrementally increasing runner length, balances and optimizes the airflow across each cylinder and provides the optimum air exit angle. Additionally, the pressure differential created by the widening of the plenum 10 from the top surface 104 to the bottom surface 105 will tend to force air into the runners from the top down, increasing and balancing airflow to the runners and eventually to the cylinders. Moreover, the geometry of the manifold 1 and the angle at which air exist the runners and enters the cylinder head causes a substantial increase in "swirl" of air into the cylinders, which causes a more even distribution of vaporized fuel in each cylinder therefore providing more robust combustion.

With this significantly more balanced airflow and increased swirl, the fuel/air mixture in each cylinder is more consistent cylinder-to-cylinder, providing for a cleaner and more efficient fuel burn which greatly enhances efficiency, power, and torque of the engine while also lowering carbon emissions. Additional benefits include increased engine and drivetrain life as the cylinders run more evenly, providing even power to the driveshaft. Indeed, the intake manifold of the present invention has demonstrated a 6-7% increase in fuel economy simply when bolted-on as a replacement for the standard manifold found on a Volvo D13 motor, i.e. without tuning.

It is appreciated that the present invention has been described in exemplary fashion with reference to the drawings appended hereto. The intake manifold 1 is not limited to application for a particular engine or type of engine but rather the design considerations can be carried through to any engine application including diesel, gasoline, flex fuel, alternative fuel, or the like. While the relative dimensions are not limiting in any respect, it is useful to provide some examples. In one embodiment, the length of the runners are as follows: first runner 11a —7.182", second runner 11b —7.005", third runner 11c —7.629", fourth runner 11d —8.857", fifth runner 11e —10.597", and sixth runner 11f —12.574". In one embodiment, the runners taper in cross sectional area from 4.242 square inches at the plenum 10 to 3.597 square inches at the flange 12. It is certainly appreciated and understood that such dimensions can vary based on design and application considerations without departing from the spirit and scope of this invention. It is also appreciate that, in some embodiments, the runners 11 need not extend straight out from the plenum 10, but rather can be bent or curved at certain angles to match the geometry of an engine compartment. For example, the runners 11 could be bent such that the flange 12 is perpendicular to the bottom surface 105 of the plenum while the remaining design considerations remain intact to provide optimal air flow and air exit angles into the cylinder head.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. An intake manifold, comprising: an asymmetrical plenum having a first end including an inlet, a closed terminal end, a top surface and a bottom surface; a flange; a plurality of runners extending from said bottom surface of said plenum and terminating at said flange; said plenum defining an interior space in flow communication with said runners; wherein, in profile, said top surface is concave, curving inward toward a center of said plenum and said bottom surface is convex, curving away from said center of said plenum; wherein said interior space of said plenum is configured such that a vector angle of air exiting each of said plurality of runners are the same.

2. The intake manifold of claim 1, wherein said each of said plurality of runners taper down from said plenum to said flange.

3. The intake manifold of claim 1, wherein an interior aspect of each of said plurality of runners at said bottom surface is radiused.

4. The intake manifold of claim 1, wherein said intake manifold is configured to be attached to a cylinder head at said flange, placing each of said plurality of runners in flow communication with a respective conduit of said cylinder head.

5. The intake manifold of claim 1, wherein each of said plurality of runners has a different length.

6. The intake manifold of claim 1, wherein each of said plurality of runners is curved.

* * * * *